J. DAVIDSON.
SEED HULLING MACHINE.
APPLICATION FILED MAY 29, 1913.
1,083,004.
Patented Dec. 30, 1913.
2 SHEETS—SHEET 1.
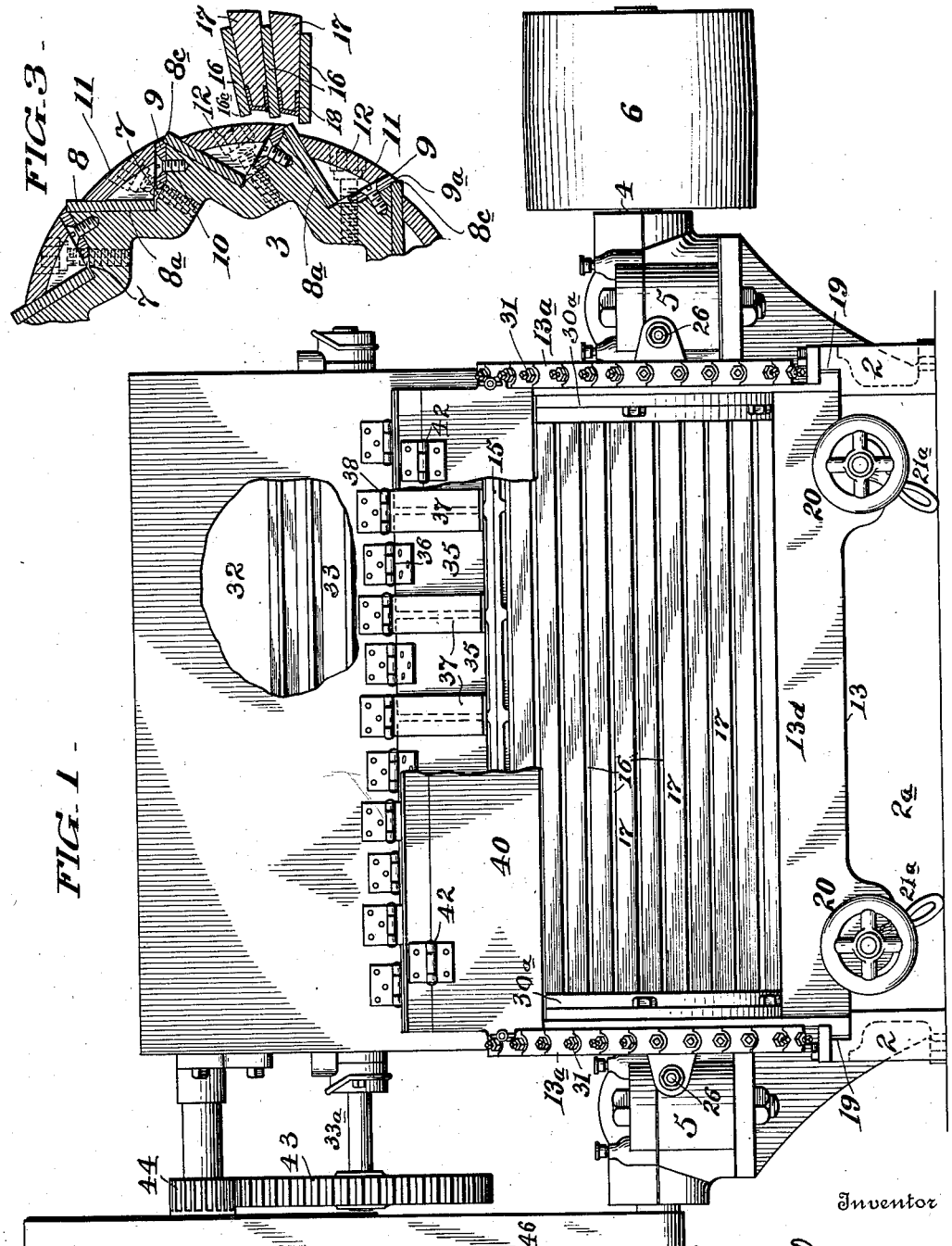

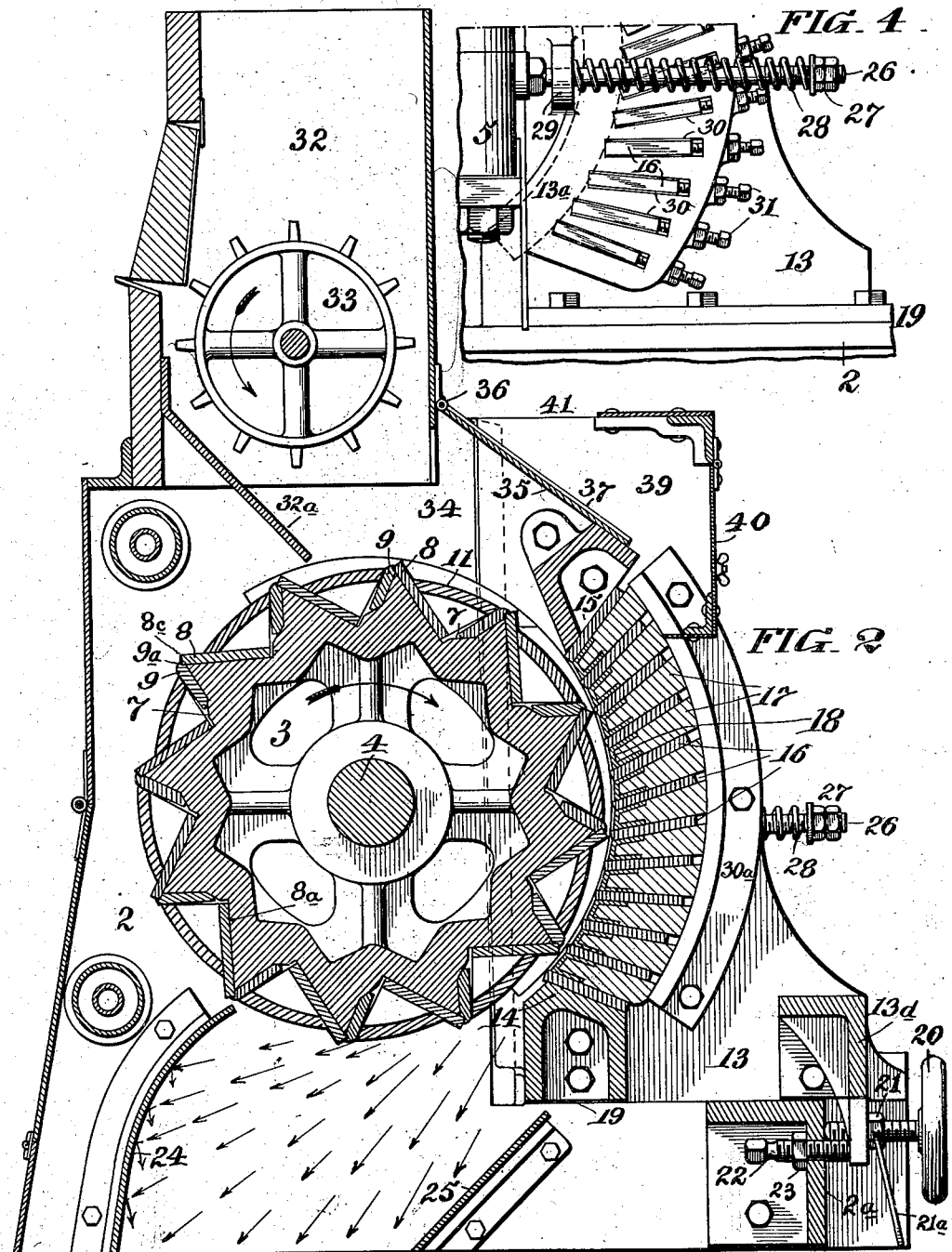

UNITED STATES PATENT OFFICE.

JOSEPH DAVIDSON, OF GREENVILLE, SOUTH CAROLINA, ASSIGNOR OF ONE-HALF TO AMERICAN MACHINE & MANUFACTURING COMPANY, A CORPORATION OF NORTH CAROLINA.

SEED-HULLING MACHINE.

1,083,004.  Specification of Letters Patent.  Patented Dec. 30, 1913.

Application filed May 29, 1913. Serial No. 770,622.

*To all whom it may concern:*

Be it known that I, JOSEPH DAVIDSON, citizen of the United States, and resident of Greenville, county of Greenville, and State of South Carolina, have invented an Improvement in Seed-Hulling Machines, of which the following is a specification.

The object of my invention is to provide a seed huller suitable for hulling cotton and other seed in an efficient manner, and which shall embody many improvements whereby the hulling cylinder blades or knives may be adjustably clamped to the hulling cylinder in a manner which enables them to be accurately and quickly set after being removed for sharpening or when new knives are inserted in the machine.

My object is also to provide an adjustable breast frame having the breast knives suitably clamped and yieldingly pressed toward the hulling cylinder without having the knives thereof brought into direct contact with the knives of the said cylinder, the said yielding adjustment providing for the ready discharge of hard foreign bodies which may pass between the cylinder and breast knives during the operation of the machine.

My object is also to provide means offering a minimum resistance, which shall permit of the escape of pieces of metal or other objects larger and heavier than seed delivered to the hulling cylinder, whereby they are freely separated from the seed which pass to the cylinder and breast knives.

My invention further consists in providing, in the discharge passage, suitably shaped guide plates which shall receive the impact of the hulled seed and direct the same out of the machine without clogging or otherwise hampering the free discharge.

Other objects are accomplished by my improvements and will be referred to hereinafter in connection with the description of the details of the machine.

My invention consists in certain features of construction, in a seed hulling machine, which enable the above objects, and those hereinafter set out, to be satisfactorily accomplished; and these improvements comprehend details of construction which are illustrated in the drawings and more fully described hereinafter and specifically defined in the claims.

Referring to the drawings:—Figure 1 is an elevation of a seed hulling machine embodying my invention, with portions thereof broken away; Fig. 2 is a transverse sectional elevation of the same; Fig. 3 is a transverse sectional elevation of a portion of the hulling cylinder and a portion of the knives of the breast frame; and Fig. 4 is an end elevation of a portion of the machine showing the manner of applying spring pressure to the breast frame and the manner of holding the breast knives in position.

2 is the main frame of the machine, and may be of any suitable construction. It is provided at the top with a feeding chute 32, having therein a feeding cylinder 33 by which the seed is fed downward, and by means of a plate 32$^a$, is dropped directly on top of the hulling cylinder 3, and spread over the full width thereof. This hulling cylinder 3 is carried upon a shaft 4 journaled in suitable bearings 5 in the main frame of the machine and having at one end the driving pulley 6, and at the other end a portion 4$^a$ acting as a small belt pulley which drives the belt 46. The belt 46 slowly rotates a large pulley 45 having a pinion 44, said pinion meshing with a spur wheel 43 on the shaft 33$^a$ of the feed cylinder 33. In this manner, the feed cylinder is rotated slowly, while the hulling cylinder 3 is rotated at a very rapid speed.

The main frame 2 is suitably cut away at one side to receive a breast frame 13 which is supported for sliding movement upon the horizontal guideways 19 of the main frame. This construction permits the breast frame to be moved into close proximity to the main frame 2 and thus bring the main frame knives into operative relation to the breast knives which will later be described. The breast frame as here shown comprises two segments 13$^a$ concentrically arranged with respect to the hulling cylinder, and secured together by a lower transverse bar 14 and an upper transverse bar 15, the said bars being spaced apart and adapted to receive the breast knife mechanism between them.

13$^d$ designates a transverse base plate connecting the segments 13$^a$ and forming not only a stiffening means but also providing a support for certain adjusting devices.

Both the hulling cylinder 3 and the breast frame 13 are provided with knives, respectively indicated at 8 and 16, which cooperate in hulling the seed without direct contact with each other. The breast frame is pressed toward the hulling cylinder by means of coil springs 28 which are supported upon and guided by the studs 26 which extend horizontally from the bearings 5 of the main frame, and press upon the lugs 29 of the breast frame. The ends of the studs 26 are provided with nuts 27 which are screwed upon said studs to take the thrust of the springs thereon. These springs are so arranged that they force the breast frame toward the hulling cylinder in a direction parallel to the guides 19 on which the breast frame moves; and moreover, these springs apply their pressure in substantial alinement with the axial line of the hulling cylinder. The movement of the breast frame toward the hulling cylinder is limited by set screws 22 carried in the transverse part 2$^a$ of the main frame, the said set screws acting as abutments for the part 13$^d$ of the breast frame. By means of these set screws, the space between the knives of the huller cylinder and the breast frame may be adjusted to exactly that which is required to suit the seed which is to be hulled. The set screws may be locked in position by means of lock nuts 23 when the proper degree of adjustment is obtained. The transverse part 13$^d$ of the breast frame is also provided with the hand adjusting screws 20, which may also act as abutments by contacting with the frame 2$^a$ to limit the movement of the breast frame toward the hulling cylinder under the action of the springs 28; but the function of these particular screws 20 is intended more for adjusting the breast frame before employing the set screws to act as the limit stops. These hand operated screws 20 are arranged at opposite ends of the breast frame as shown in Fig. 1, and may therefore enable the two ends to be differently adjusted, if necessary. When the proper adjustment is determined, then the set screws 22 are adjusted to act as the positive stops. Lock nuts 21 are employed in connection with the adjusting screws 20 to lock these screws when set, if so desired, and said lock nuts may be provided with adjusting handles 21$^a$ to operate them, if so desired.

Considering more specifically the hulling cylinder, the construction of which is illustrated in Figs. 2 and 3, the main cylindrical portion consists of a casting having longitudinal V-shaped grooves 7 about its circumference, said grooves providing recesses in which the hulling knives 8 are arranged and clamped. These grooved portions are provided with inclined guide portions 8$^a$, which lie in planes intermediate of an axial plane and a tangential plane, so that the knives 8 lie obliquely to what would be the perimeter of the cylinder, and in this way present the cutting edges 8$^c$ formed by the juncture of one face and the edge of the knife. Secured by screws 10 to the opposite walls of the recesses 7 of the cylinder are the plates 9 which extend outwardly at an angle to the blades and are provided at their outer ends with longitudinal under-cut shoulders 9$^a$ which extend over the outer end of the cylinder knives 8 to receive the outer thrust under centrifugal action, and also to act as positive accurate guides against which the cylinder blades may be adjusted so as to insure the cutting edge 8$^c$ traversing a true circle at all points along the length of the knives. These plates 9 are formed of hardened steel and extend outwardly from the axis of the cylinder to a slightly less distance than the cutting edges 8$^c$, so as to leave the said cutting edges in operative position to act upon the seed, while at the same time providing a strong abutment for preventing the said plates from moving too far outward. The blades 8 are clamped down upon the inclined portions 8$^a$ by the clamps 11 which extend longitudinally of the length of the cylinder and press both upon the cylinder blades 8 and upon the abutment plates 9, as more clearly shown in Fig. 3. The said clamps are held down in clamping position by means of the screws 12 which are countersunk in the recesses in the said clamps and are screwed into the body of the cylinder 3, as indicated in Fig. 3. By means of these clamps 11, not only are the knives 8 held rigidly in position, but the abutment plates 9 are also held against displacement due to any outward thrust by the knives. Furthermore, these clamps 11 are so shaped as to be somewhat eccentric relatively to the axis of the cylinder, so as to reach to the outer edge of the abutment plates 9 but to terminate at some distance from the cutting edges 8$^c$ of the blades, whereby said cutting edges are more fully exposed.

By the means above described, it is evident that by loosening the clamps 11, the knives 8 may be readily removed for regrinding or for the inserting of new knives. Furthermore, as the knives are clamped in position, and always adjusted to the shoulders 9$^a$, it is evident that accuracy in the adjustment of the knives is easily accomplished, for the positioning of the said knives is secured by the contacting of their edges with the shoulders of the abutment plates close to the cutting edges 8$^c$, and hence said edges cannot become out of adjustment if the most ordinary care is employed. The plates 9 being carefully made in the construction of the machine, and not being subjected to wear, are always in condition to secure accurate self-setting of the knives. It will be understood that because of this accuracy, the hulling or cutting edges or corners 8ᶜ of the knives travel in true circles, a requirement which is essential to good results in a machine for hulling seeds. These knives may be reground until a large portion of their width is consumed before it would be necessary to supply new knives, because of the provision for the self-setting feature, comprehending the outer edge of the knives adjusting themselves positively to the different shoulders 9ᵃ which are provided to receive them. No changes in the width of the knives will affect the capacity for proper setting of them on the cylinder.

Referring now to the knife features of the breast frame, the said steel knives 16 are properly positioned relatively to each other by the slots 30 in the steel heads or ends 13ᵃ of the breast frame. These slots are so arranged relatively to each other that all of the knives 16 carried therein present the same angularity to the perimeter of the hulling cylinder and hold the knives at such angle as to present hulling edges 16ᶜ just as the hulling edges 8ᶜ are provided on the cylinder, said construction enabling the end edges of the knives to be ground at right angles to the plan of the surface. These slots 30 in the heads are so arranged that the knives 16 clamped therein have their hulling edges 16ᶜ arranged on a true circle so as to line up substantially concentric with the axis of the hulling cylinder. In this manner, the hulling edges of the knives of the cylinder will properly coöperate with all of the hulling edges of the knives of the breast frame, when the latter is in working position. Set screws 31 are provided in the heads and extend down into the slots so as to clamp the knives 16 rigidly in position. Between the knives 16 are wedge-shaped space blocks 17 having their inner edges 18 faced with metal and held in position by the curved flanges 30ᵃ. In this manner, the breast knives are built into a breast structure of great rigidity and strength, and these filling pieces 17 form at their inner ends a curved surface bridging the gaps between the adjacent knives 16 to properly guide the seed while only permitting the extreme angular edges 16ᶜ of the knives to project inwardly to co-act with the knives 8 of the cylinder. The upper knife 16 rests directly against the inclined face of the transverse portion 15 of the breast frame, and likewise the lower knife rests against the inclined face of the transverse part 14 of the breast frame, so that notwithstanding that there is considerable length to the knives and the spacing blocks, these are held against vibration by the support provided by these transverse portions 14 and 15 of the breast frame.

By the construction of the breast frame and its knives which is embodied in this machine, the knives of the hulling cylinder and the breast frame may be made to properly operate to hull seed of different sizes or to secure greater or less abrading action by the adjustment of the breast frame to or from the hulling cylinder; and the springs employed to hold the breast frame and its knives up to their work, also provide means whereby any large pieces of hard foreign substance may pass downward between the knives of the hulling cylinder and breast frame without injuring them. When such foreign matters are discharged, the springs automatically return the breast frame and knives to their normal position.

While metal or other foreign objects may in some instances pass downward between the knives, as above stated, they will in the majority of cases be thrown outward from the chamber 34 through the hinged doors 35 and 37 by impact with the hulling cylinder. As these objects would not, as a rule, be of large size or very heavy in weight, they would not have energy enough to force open a heavy door of the full length of the machine, and for that reason I form the plurality of doors 35 of comparatively small size, so that the impact of the aforesaid objects against any one of said doors will cause it to open to allow of the passage of the object into the chamber 39. As it is desirable that these doors shall not fit too tightly against each other, so as to be independently movable with the least resistance, I prefer to leave a small space between the adjacent doors. These spaces between the doors 35 I close with a second series of narrow and light doors 37 which are hinged at 38 and arranged to open freely outward. These narrow doors 37 overlap adjacent doors 35, so that when one of the latter doors is forced upward about its hinge 36, it carries with it the overlapping doors 37. In this way the light seed are kept within the chamber 34, while the heavy foreign objects are expelled into the chamber 39, said chamber being preferably open at the top at 41, and provided at its front and lower part with a discharge door 40 hinged at 42 which may be opened from time to time to clean out the objects received in the said chamber 39. As shown, the doors 35 and 37 are hinged to the casing of the hopper and chamber, and rest upon the transverse part 15 of the breast frame. The chamber 39 and door 40 are preferably formed on the breast frame as shown.

Below the hulling cylinder 3 is the discharge throat of the machine through which the hulled seed is projected. The sides of this throat are formed by the side plates 2 of the machine, and that portion of the throat below the breast frame is formed by a plate 25 which is set at an incline to the horizontal, so that any seed which may strike it will be deflected off in a downward direction and have no place upon which to lodge and build up an obstruction. The opposite face of the throat is formed by a curved plate 24 which fits between the two side frames of the machine, and this plate is curved and reaches close to the hulling cylinder, but just far enough that the knives thereof will not strike the plate. When the seed are thrown off tangentially as indicated by the arrows in Fig. 2, said seed will strike the plate and be deflected. To insure the best results and to deflect all of the seed substantially vertically downward, the curvature of the plate increases from the bottom upward toward the hulling cylinder. By means of this construction of throat and deflecting plate, there is absolutely no place upon which the seed can lodge to clog the machine, and consequently, the discharge from the machine is very free and positive.

In the operation of this machine, the cotton seed or other seed to be hulled is slowly fed to the hulling cylinder along its entire length and in such manner as not to clog the machine. By not forcing the delivery of the seed beyond the capacity of the machine, the highest efficiency will be secured in the action of the hulling knives. The arrangement of these knives gives the best coaction since each knife tends to force the seed toward the other and thereby bring it into positive position for the hulling operation. There is no possibility of seed lodging and clogging the machine.

I have shown my invention in the form I have found most satisfactory for commercial use, and while I prefer the details described, I do not restrict myself thereto, as they may be modified without departing from the spirit of the invention defined in the claims.

Having now described my invention, what I claim as new and desire to secure by Letters Patent, is:—

1. In a seed huller, the combination of the hulling cylinder having knives on its periphery, a breast frame provided with knives arranged on a curve to coöperate with the knives of the hulling cylinder, a chamber above the hulling cylinder and breast frame, means to feed the seed into the chamber, a door structure having a plurality of light door sections of relatively small size opening outwardly from the chamber above the hulling cylinder and breast knives, whereby heavy articles may be driven outward by the hulling cylinder through any one of the door sections which they may strike, said door structure consisting of a plurality of narrow door sections arranged side by side and adapted to remain normally in closed position by gravity, and a second plurality of narrow door sections overlapping the juncture of the first mentioned door sections and respectively adapted to be moved with either of said first mentioned door sections which it overlaps.

2. A hulling cylinder for a seed huller, having its periphery formed with a plurality of inclined knives, combined with shouldered plates secured to the hulling cylinder at an angle to the knives and having their outer edges arranged to extend over a portion of the edges of the knives to hold them from moving outward, longitudinal clamping parts extending for the full length of the knives and arranged in the periphery of the cylinder within a space traversed by the cutting edges of the knives, and clamping screws arranged in the clamping parts and extending into the hulling cylinder for holding said clamping parts in position upon the knives and permitting them to be separately loosened when it is desired to remove a knife or knives for purposes of replacement or sharpening.

3. In a hulling cylinder for seed huller, the combination of the cylinder proper having a plurality of longitudinal inclined portions forming a corresponding series of knife seats, means rigidly secured to the cylinder and projecting beyond the outer edges of the inclined seat portions and providing a plurality of under cut guiding shoulders, a plurality of knives resting against the inclined seat portions and having their outer ends abutting against the under cut guiding shoulders to accurately adjust the outer cutting edges of the knives so that they all describe a true common circle, and means carried with the cylinder for clamping the knives in their adjusted positions.

4. In a hulling cylinder for seed huller, the combination of the cylinder proper having a plurality of longitudinal inclined portions forming a corresponding series of knife seats, means formed of longitudinal plates rigidly secured to the cylinder and projecting beyond the outer edges of the inclined seat portions and providing a plurality of under cut guiding shoulders, a plurality of knives resting against the inclined seat portions and having their outer ends abutting against the under cut guiding shoulders to accurately adjust the outer cutting edges of the knives so that they all describe a true common circle, means carried with the cylinder for clamping the knives in their adjusted positions consisting of longitudinal clamps between the knives and the longitudinal plates having the under cut shoulders, and clamping screws extending through said clamps and into the cylinder at points between the plates and knives.

5. In a seed huller, a hulling cylinder having a recess therein, a cutting knife seated in said recess and projecting exterior thereof, a plate removably secured to said cylinder and extending into the path of movement of said knife to prevent said knife shifting under centrifugal action, and means to clamp said knife to prevent lateral movement thereof.

6. In a seed huller, a hulling cylinder having a plurality of recesses therein, a cutting knife seated in each recess and projecting exterior thereof, a plate removably secured in each recess and extending into the path of movement of the cutting knife located in the next adjacent recess to prevent said knives shifting under centrifugal action, and independent means to clamp each knife to prevent lateral movement thereof.

7. In a seed huller, a hulling cylinder having recesses therein and a plurality of shoulders all positioned at substantially the same radial distances from the axis of the hulling cylinder, a plurality of cutting knives each located in one of said recesses and retained by the shoulder adjacent said recesses, said shoulders being located in the path of movement of said cutting knives under centrifugal action, and independent means for holding each knife against lateral displacement.

8. In a seed huller, a hulling cylinder having a longitudinal recess therein substantially the length of said cylinder, a cutting knife seated in said recess and projecting therefrom to form a cutting edge parallel to the axis of said cylinder, a plate secured to said cylinder adjacent said knife, said plate having a shoulder against which said knife abuts to lock the latter against centrifugal action, and independent means to clamp said knife against lateral movement.

9. In a seed huller, a hulling cylinder having a plurality of longitudinally disposed recesses therein extending substantially the length of said cylinder, a cutting knife seated in each recess all of said knives projecting to form a plurality of cutting edges positioned substantially the same radial distance from the axis of said cylinder, plates located respectively in each recess, each plate being provided with a shoulder against which the adjacent knife abuts to lock the latter against centrifugal action, and independent means in each recess for clamping the respective knives against lateral movement.

In testimony of which invention, I hereunto set my hand.

JOSEPH DAVIDSON.

Witnesses:
W. McC. NEALE,
H. M. JACKSON.